Figure 1:
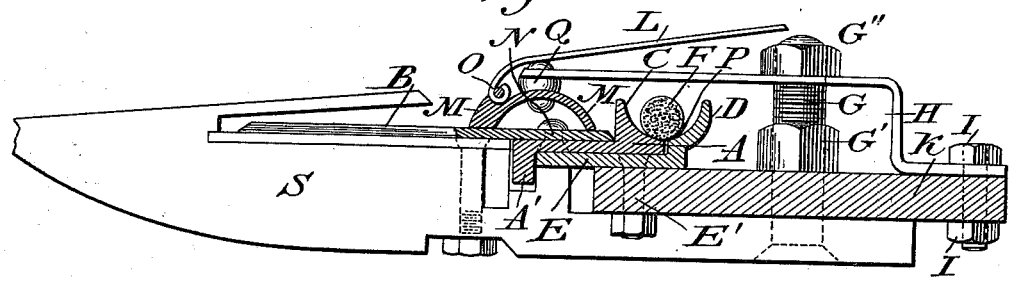
Figure 2:
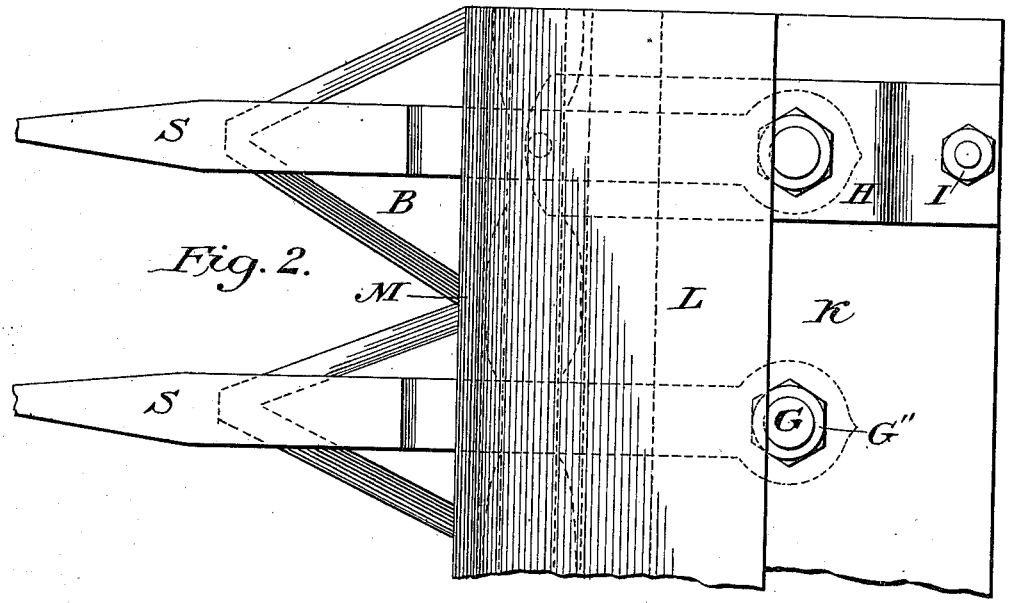

No. 669,479. Patented Mar. 5, 1901.
L. J. W. H. GIFFHORN.
CUTTING APPARATUS FOR MOWING MACHINES.
(Application filed May 10, 1899.)
(No Model.)

Witnesses: Emily Giffhorn. Geo. M. Dorn

Inventor: L. J. W. H. Giffhorn

THE NORRIS PETERS CO., PHOTO-LITHO., WASHINGTON, D. C.

UNITED STATES PATENT OFFICE.

LUDWIG JUL. WILH. HENRY GIFFHORN, OF SPOTSWOOD, NEW JERSEY.

CUTTING APPARATUS FOR MOWING-MACHINES.

SPECIFICATION forming part of Letters Patent No. 669,479, dated March 5, 1901.

Application filed May 10, 1899. Serial No. 716,328. (No model.)

*To all whom it may concern:*

Be it known that I, LUDWIG JULIUS WILHELM HENRY GIFFHORN, a citizen of the United States residing at Spotswood, in the county of Middlesex and State of New Jersey, have invented a new and useful Cutting Apparatus for Mowing-Machines, of which the following is a specification.

My invention relates to improvements in the cutting apparatus of mowing-machines; and one object of my improvements is to simplify the manufacture of and to further improve the cutting apparatus as granted to me by Letters Patent No. 621,562, dated March 21, 1899; also, to provide an improved hinged cover which can be folded back or opened when oiling or adjusting the machine and which will provide for the smooth passage of the cut grass, clover, grain, &c.

In the drawings, Figure I is cross-section of the apparatus. Fig. II is a plan of the apparatus.

In the drawings, K is the finger-bar. To the forward under surface of the finger-bar are attached the fingers S by bolts G and nuts G'. Through the fingers S is formed a transverse passage-way to receive and guide the lower extension A' of the knife-bar A, to the upper surface of which the common knives B are secured by countersunk rivets N. The knife-bar A is extended rearward behind the knife and has a rib C upon its upper surface. To the forward upper surface of the finger-bar K is secured a wear-plate E by bolts E'. This wear-plate E is a broad steel rail, which extends along the whole length of the cutting apparatus in one continuous piece and furnishes a solid bearing for the knife-bar A. The rear edge D of the wear-plate E is upturned and bent to the side. This edge D and the rib C of the knife-bar form a groove or channel P to receive the lubricant. The groove or channel thus formed may receive an oiling-rope F, which extends throughout the entire length of the cutting apparatus and is oiled from above to slowly yield up the oil in small quantities to the space between the knife-bar and wear-plate. If desirable, the rope may be dispensed with and the oil poured directly into the groove or channel, from whence it will run into its proper place. This construction differs from that shown in Letters Patent No. 621,562 in that the knife-bar here bears upon the wear-plate and forms a groove therewith instead of the knife-blades. This construction permits of all parts being manufactured by the roller process.

To retain the knives in their proper place, a presser device is used, as in Patent No. 621,562, comprising a double rail M M, which extends longitudinally over the knives and knife-bar. Said double rail is adjustably held in contact with the upper surface of the knives by means of steel spring-keepers H. The keepers are bolted to the finger-bar at their rear ends by means of bolt and nut I I and are adjusted by nuts G" on bolts G, which pass through perforations in the keepers. Between the double rail M M and the keepers H springs Q are placed.

To protect the cutting apparatus from dust and grass and to afford a smooth passage-way for the cut grass, I provide a hinged cover L of thin sheet metal, extending over the cutting apparatus. It is hinged to the front part of the double rail by a hinge O and can be thrown back or opened when oiling, repairing, or adjusting the machine.

What I claim as my invention is—

1. The combination in the cutting apparatus of a mowing-machine of the steel wear-plate with rear edge upturned and bent rearward, a knife-bar A, having a reinforcing-rib A' on its forward under surface, and a rib C on its rear upper surface, the rear edge D of the wear-plate and the rib C of the knife-bar forming a groove to receive the lubricant, all substantially as set forth, for the purpose specified.

2. The combination in the cutting apparatus of a mowing-machine of spring-keeper H, adjusting-bolts G therefor, a bearing-rail M M, with springs Q interposed between said bearing-rail and spring-keeper, and a hinged cover L, hinged to the front part of the bearing-rail M M, substantially as described, for the purpose specified.

3. A knife-bar A, having a reinforcing-rib A' on its forward under surface, and a rib C on its rear upper surface, substantially as described.

LUDWIG JUL. WILH. HENRY GIFFHORN.

Witnesses:
ALICE M. DEVOE,
EMILY GIFFHORN.